(12) United States Patent
Dai et al.

(10) Patent No.: US 7,763,314 B2
(45) Date of Patent: Jul. 27, 2010

(54) FORMING AN ELECTROWETTING MODULE HAVING A HYDROPHILIC GRID

(75) Inventors: Steve Dai, Gilbert, AZ (US); Hao Li, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 395 days.

(21) Appl. No.: 12/021,404

(22) Filed: Jan. 29, 2008

(65) Prior Publication Data
US 2009/0191334 A1    Jul. 30, 2009

(51) Int. Cl.
 B05D 5/12 (2006.01)
 C08F 2/48 (2006.01)
 C08F 2/46 (2006.01)
 G02B 26/02 (2006.01)
 G02B 26/08 (2006.01)
(52) U.S. Cl. ............ 427/164; 427/162; 427/165; 427/108; 427/487; 427/510; 359/227; 359/228; 359/291
(58) Field of Classification Search ............... 427/162
 See application file for complete search history.

(56) References Cited

U.S. PATENT DOCUMENTS

2008/0119383 A1* 5/2008 Boardman et al. ......... 510/521

FOREIGN PATENT DOCUMENTS

WO   WO2006017129   *   2/2006

OTHER PUBLICATIONS

Sakai et al., "Effect of Ultrasonic Treatment on Highly Hydrophilic TiO2 Surfaces", Langumir, 1998, pp. 5918-5920.*
Iizumi, Y., et al, A novel hole-injection layer with the ability of forming hydrophobic-hydrophilic patterns., Lasers and Electro-Optics, pp. 670-671, Aug. 2005.
Kolari, K., et al., Tunable hydrophilicity on a hydrophobic fluorocarbon polymer coating on silicon, J. Vac Sci. Technol., A., 24 (4) pp. 1005-1011, Jul./Aug. 2006.

* cited by examiner

Primary Examiner—Barbara L Gilliam
Assistant Examiner—Lisha Jiang

(57) ABSTRACT

A method of forming a matrix of electrowetting pixels includes forming a patterned layer of electrodes (512) on a substrate (510) and forming a patterned insulating layer (514) on the electrodes (512) and the substrate (510) to define a plurality of wells (516), each of the wells (516) aligned over one of the electrodes (512). A hydrophobic material (518) is formed on the bottom surfaces of the wells (516) and a hydrophilic material (526) is formed on sidewalls (519) of the wells (516), for example by one of selective reaction, selective deposition and selective etching, by the application of a beam (524) at an angle to impact the sidewalls (519) while substantially avoiding impacting the bottom surface (515). First and second liquids (532, 534) are disposed within the wells (516), the first liquid being not soluble in the second liquid.

18 Claims, 5 Drawing Sheets

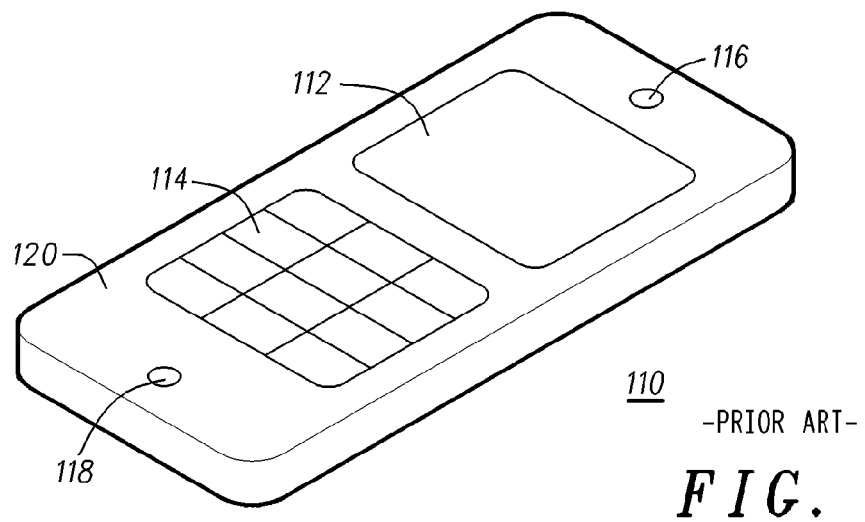
*FIG. 1* -PRIOR ART-
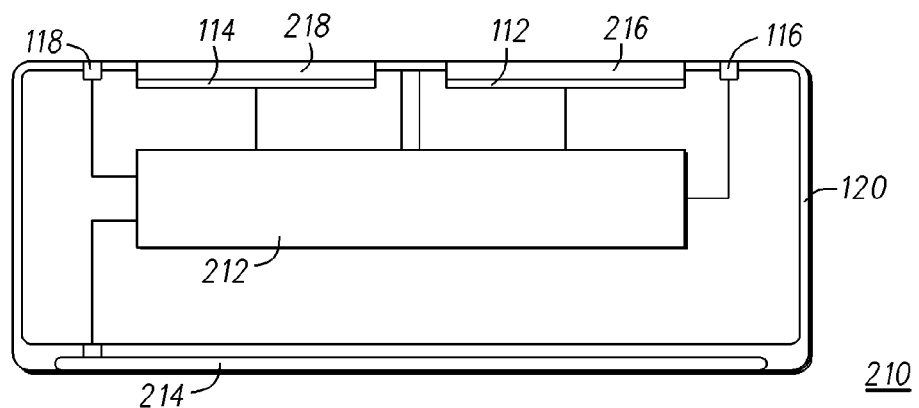
*FIG. 2*
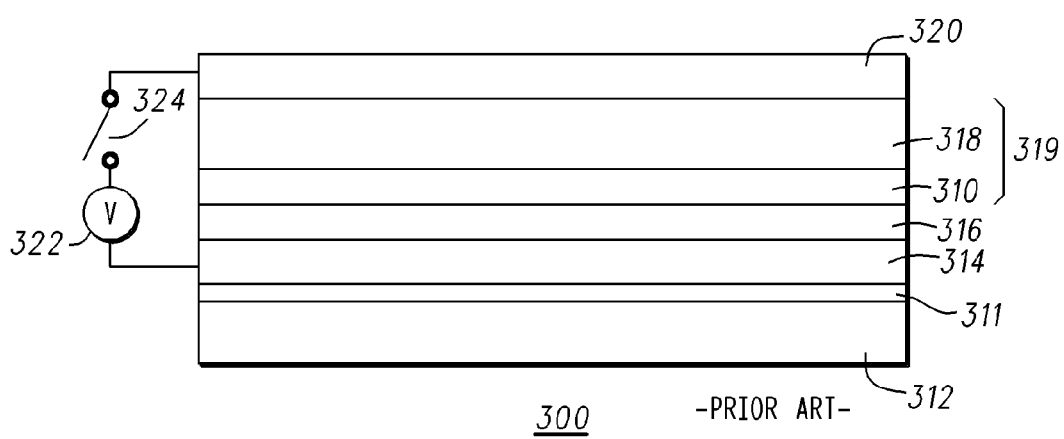
*FIG. 3* -PRIOR ART-

FORMING AN ELECTROWETTING MODULE HAVING A HYDROPHILIC GRID

FIELD

The present invention generally relates to electronic devices and more particularly to a method for forming an electrowetting module having a hydrophilic grid.

BACKGROUND

The market for personal portable electronic devices, for example, cell phones, laptop computers, personal digital assistants (PDAs), digital cameras, and music playback devices (MP3), is very competitive. Manufacturers, distributors, service providers, and third party providers have all attempted to find features that appeal to the consumer. Manufacturers are constantly improving their product with each model in the hopes it will appeal to the consumer more than a competitor's product. Many times these manufacturer's improvements do not relate directly to the functionality of the product.

The look and feel of personal portable electronics devices is now a key product differentiator and one of the most significant reasons that consumers choose specific models. From a business standpoint, outstanding designs (form and appearance) may increase market share and margin.

Consumers are enamored with customizable features, e.g., colors, ring tones, shapes, on portable electronic devices. These features reflect personal style. Consumers select them for some of the same reasons that they select clothing styles, clothing colors, and fashion accessories. These two worlds have not merged because consumers have multiple sets of clothing and generally only one personal electronic device (perhaps of each type), and this device has a single defined color, texture, or shape. In short, consumers have a very limited ability to match colors and patterns of personal electronic devices to their clothing, their accessories, their car, or their mood. Plastic snap-on covers for devices such as cell phones and MP3 players can be purchased in pre-defined patterns and colors. These snap-on covers are quite popular, and yet they provide a limited customization capability.

There is clearly a need for a better solution: a need for a technology that will allow consumers to easily and conveniently change the color and pattern of their portable electronics device according to both their moods and wearable items without depleting power from their portable electronics device.

In many portable electronic devices, such as mobile communication devices, the main displays present information, including video and text, to a user. Electrowetting light valves, a low cost reflective display technology, have been suggested for a number of uses, including selective revealing a display and changing the color of the surface of a housing. This low cost reflective display technology comprising electrowetting light valves, may be used to produce shutters over a reflective surface. Typical electrowetting devices use a DC voltage to change the wetting properties between a solid and a liquid, thereby moving an oil droplet like a shutter in and out of view. The 'open' condition of the shutter is transparent (not black or white) so that the underlying colors are visible. These reflective displays are built above a reflective surface that reflects ambient light through the device to illuminate the oil or lack thereof.

Known methods of fabricating electrowetting devices include forming micro cell arrays with hydrophilic walls and hydrophobic bottom layers. Traditional methods coat the surface of a substrate with a hydrophobic layer. A hydrophilic grid is then formed on top of the hydrophobic layer to create the micro cell array. Normally, this approach is expensive and it is difficult to control the adhesion between the hydrophobic grid and the hydrophilic layer.

Accordingly, it is desirable to provide a method of fabricating an electrowetting module having a hydrophilic grid for revealing a functional element within the housing or for revealing another housing appearance. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements, and FIG. 1 is an isometric view of a known portable electronic device that may be used in accordance with an exemplary embodiment;

FIG. 2 is a schematic cross section of the portable electronic device of FIG. 1 modified in accordance with an exemplary embodiment;

FIG. 3 is a schematic cross section of a known electrowetting display;

DETAILED DESCRIPTION

Figure 4:
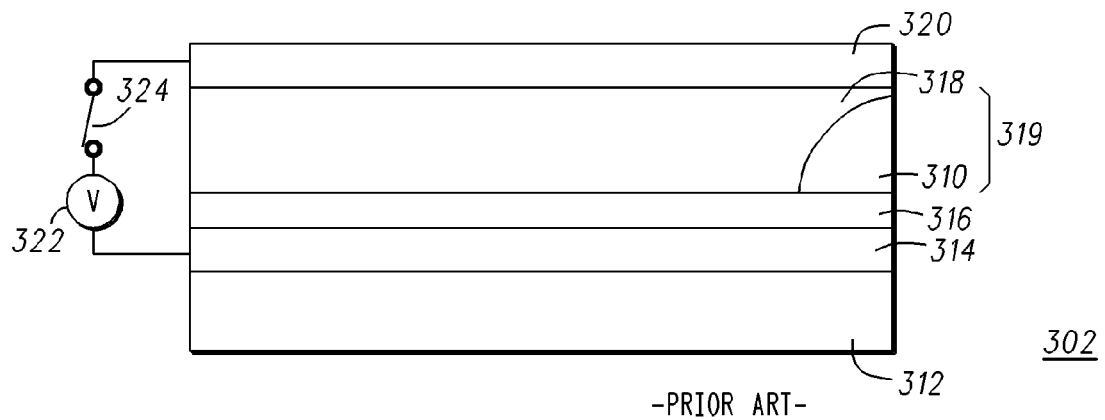
FIG. 4 is a schematic cross section of the known electrowetting display of FIG. 3 with power applied.

The following detailed description is merely exemplary in nature and is not intended to limit the invention or the application and uses of the invention. Furthermore, there is no intention to be bound by any theory presented in the preceding background or the following detailed description.

A method of fabricating an electrowetting module within a housing of an electronics device is provided, wherein an underlying texture, pattern, and/or color can be selected by a consumer (i.e., "electronics device user") or a functional device such as a display may be made visible. A "pattern" is a decorative design and may include elements of color (or more than one color or shade), shape, and/or texture.

The exemplary embodiment described herein gives the consumer control over the colors and textures (and the patterns of the colors and textures) of their electronics devices. An oil in the well of a patterned insulating layer may be one color/pattern, while an underlying layer may be another color/pattern. A hydrophobic material is formed on the bottom surfaces of the wells and a hydrophilic material is formed on sidewalls of the wells, for example by one of selective reaction, selective deposition and selective etching, by the application of a beam at an angle to impact the sidewalls while substantially avoiding impacting the bottom surface. First and second liquids are disposed within the wells, the first liquid being not soluble in the second liquid.

FIG. 1 shows in schematic form an electronic device 110, more specifically a mobile communication device, which may be used with the exemplary embodiment described herein, and includes a display 112, a control panel 114, a speaker 116, and a microphone 118 formed within a housing 120. Conventional mobile communication devices also include, for example, an antenna and other inputs which are omitted from the figure for simplicity. Circuitry 212 (shown in block form in FIG. 2) is coupled to each of the display 112, control panel 114, speaker 116, and microphone 118. Although this embodiment describes a mobile communication device, the electronic device 110 can take other forms such as a laptop computer, personal digital assistant (PDA), digital camera, a music playback device (e.g., MP3 player), gaming devices, and may include non-portable electronic devices. It is also noted that the portable electronic device 10 may comprise a variety of form factors, for example, a "foldable" cell phone.

FIG. 2 shows in schematic form a cross section of the portable electronic device 210 of FIG. 1 and in accordance with an exemplary embodiment. The portable electronic device 110 comprises electrowetting modules 214, 216, 218 disposed over a surface of the housing 120, the display 112, and the control panel 114, respectively, and which are coupled to the circuitry 212. Although the electrowetting module 214 is shown as only being positioned on a surface on the rear of the housing 120, it may cover multiple surfaces of the portable electronic device 110. Additionally, it is noted that one or more of the surface of the housing 120, the display 112, and the control panel 114 may be covered by an electrowetting module.

The exemplary embodiments described herein may be fabricated using known lithographic processes as follows. The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned. Alternatively, an additive process could also be used, e.g., building a structure using the photoresist as a template.

Though the above described lithography processes are preferred, other fabrication processes may comprise any form of lithography, for example, ink jet printing, photolithography, electron beam lithography, and imprint lithography ink jet printing. In the ink jet printing process, the EL particles are combined in liquid form with the oil and printed in desired locations on the substrate.

A low cost reflective display technology, electrowetting light valves, may be used to produce a shutter over a reflective surface or to reveal functional elements therebelow. Typical electrowetting devices use a low frequency voltage, including DC, to change the wetting properties of a drop of oil in water, thereby moving the oil (which may be colored) like a shutter in and out of view. The 'open' condition of the shutter is transparent (not black or white) so that the underlying colors are visible when the first color is "off".

FIG. 3 is partial cross section of a known electrowetting display 300 of a single pixel comprising a reflective material 311 deposited on a substrate 312 and a transparent electrode 314 is formed on the reflective material 311. A transparent hydrophobic insulator 316 is formed on the electrode 314 for supporting the combination of oil 310 and water 318. A transparent electrode 320 is formed above and for containing the water 318 and oil 310 in a cavity 319. A DC/low frequency voltage source 322, e.g., DC to 200 hertz, is coupled between the electrodes 314 and 320, and is selectively applied by closing the switch 324. Referring to the structure 302 of FIG. 4, when the switch 324 is closed and a voltage is applied across the conductors 314 and 320, the oil 310 moves to the side as is known in the industry by being displaced against the transparent hydrophobic insulator 316 by the water 318.

Figure 5:
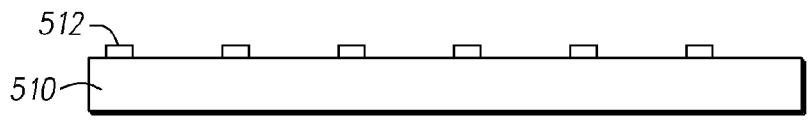
FIGS. 5-8 are cross sections of six pixels during fabrication of a first exemplary embodiment.
Figure 6:
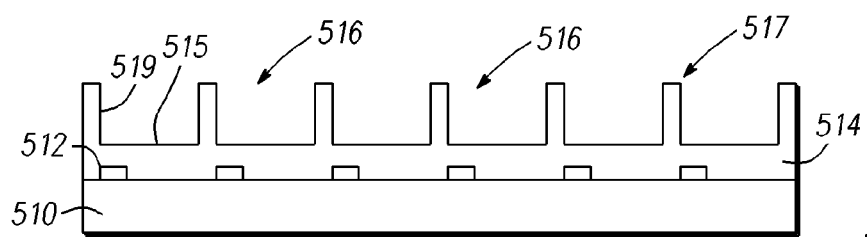

Referring to FIGS. 5 and 6 and in accordance with the method of the exemplary embodiment, electrodes 512 are formed in a pattern on a substrate 510 and a transparent material 514 is patterned to create a matrix, or grid, of wells 516 separated by raised portions 517, using standard lithographic methods described above. Each of the wells 516 includes a bottom surface 515 and sidewalls 519. Although six wells 532 are shown, it should be understood a large plurality of wells 532 may be fabricated. The substrate 510 is generally a reflective material of any desired color in one embodiment, and may be transparent (for revealing a functional element therebelow) in another embodiment. The transparent substrate 510 may be any transparent material, but may be, for example, glass, ceramic, insulated metal, polymers, and polymer composites. The electrodes 512 are a conductive, transparent material such as metal, and more preferably indium tin oxide or poly-3,4-ethylenedioxthiophene (PEDOT). The transparent material 514 may be any insulating, transparent material such as formed from polymethyl methacrylate (PMMA), a photoresist such as epoxy-based SU8 from Microchem, or by hot embossing.

Figure 7:
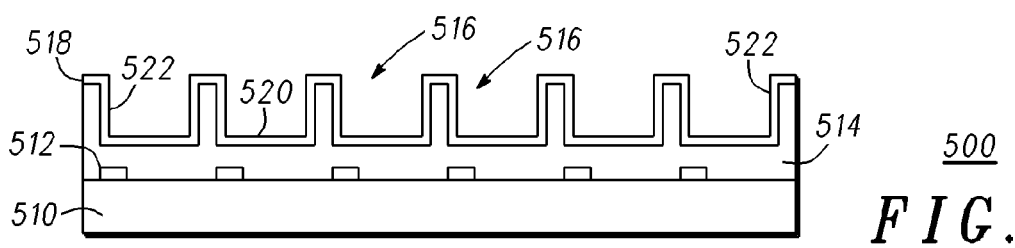
Figure 8:
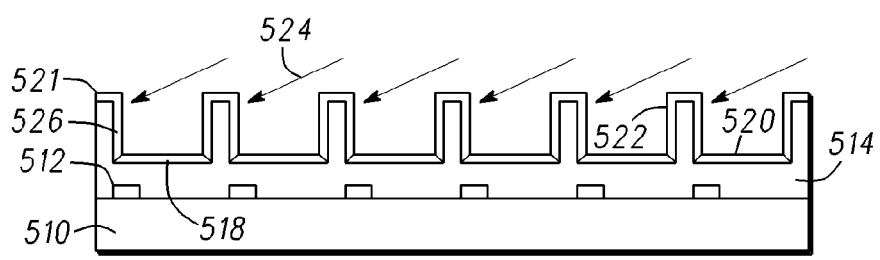

There are at least three ways to modify the surface: selective reaction, selective deposition and selective etching. In the selective reaction exemplary embodiment, a hydrophobic layer 518 (FIG. 7) is conformally coated in a well-adhered manner on the material 514, providing a bottom surface 520 and sidewalls 522 within the wells 516. The hydrophobic layer 518 preferably is fluoropolymers and parylene. Referring to FIG. 8, the surface of the side walls 522 are subjected to a beam 524 at an angle such that the bottom surface 520 is not substantially impacted by the beam 524 due to the raised portions 517. The beam 524 converts the hydrophobic material on the sidewalls 522 to a hydrophilic material by adding hydroxyl groups, and an injection of polar molecules capable of hydrogen bonding changes the hydrophobic material to a hydrophilic material 521, while the bottom surface 520 remains covered by hydrophobic material. The composition of the beam 524 depends on the composition of the hydrophobic layer 518, but may be an ion/molecular beam, polarized light from a laser, ultra violet light, or x-ray. Complex masking otherwise required to create hydrophilic sidewalls is avoided by use of the angled beam 524.

Figure 9:
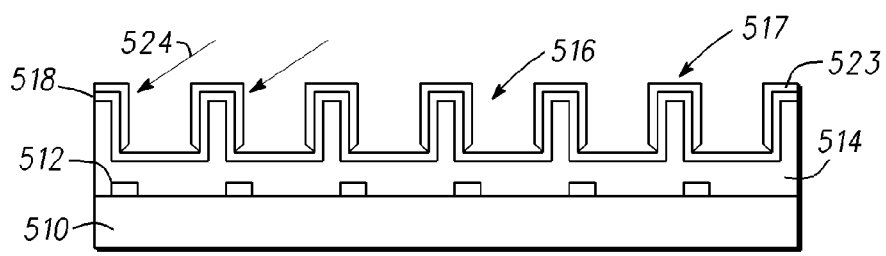
FIG. 9 is a cross section of six pixels during fabrication of a second exemplary embodiment.

In the selective deposition exemplary embodiment, (laser/ion assisted selective deposition), the structure 500 (FIG. 7) is placed in an ambient that contains a reactive gas that deposits, over the hydrophobic layer 518, a hydrophilic layer 523 while applying energy, from for example, a laser or UV light. This application of energy selective deposits the hydrophilic layer 523 onto the sidewalls 522 of the raised portions 517 (FIG. 9).

Figure 10:
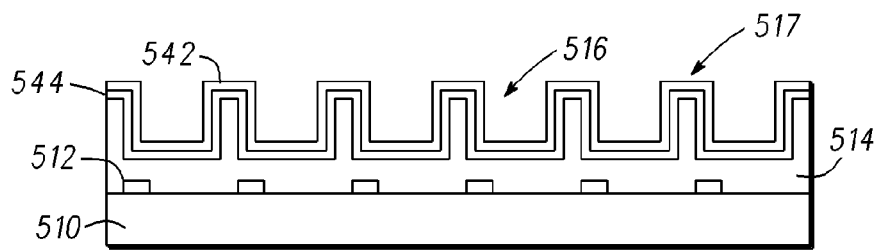
FIG. 10-11 are cross sections of six pixels during fabrication of a third exemplary embodiment.
Figure 11:
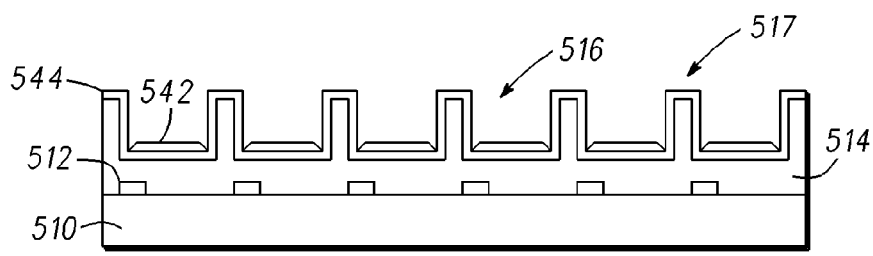

The selective etching exemplary embodiment\ includes coating a hydrophobic layer 542 over a hydrophilic layer 544 (FIG. 10), and selectively removing the hydrophobic layer 542 on the sidewalls by laser or UV activation (FIG. 11).

For the first two examples above, it should be noted that the transparent material 514 itself can be hydrophobic, for which the deposition of hydrophobic layer 518 is not necessary.

Figure 12:
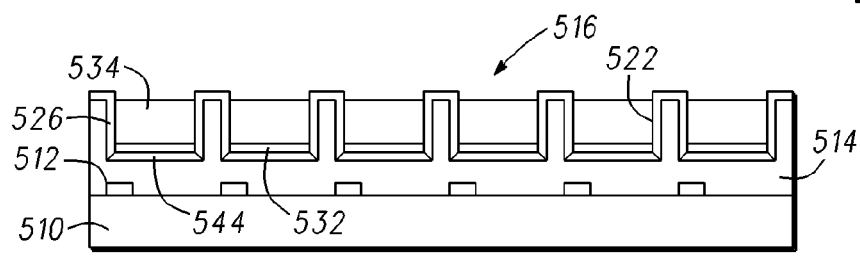
FIG. 12 is a cross section of the exemplary embodiment without power applied.
Figure 13:
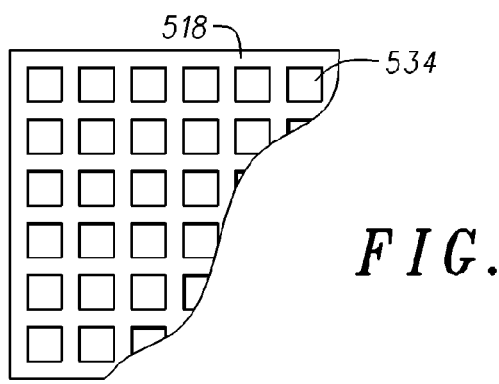
FIG. 13 is a top view of the exemplary embodiments.
Figure 14:
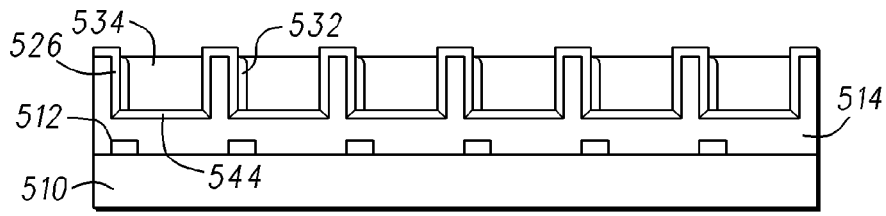
FIG. 14 is a cross section of the exemplary embodiment with power applied.

First and second liquids, such as an oil 532 and water 534, are positioned in the well 516 (FIG. 12). While oil and water are examples of the first and second liquids, the first and second liquids may be any liquid as long as one is not soluble in the other, and one has different surface energy than the other. The oil 532 is, for example, a mineral oil containing pigments which are soluble in oil, but not water. Example pigments or chromophores are commercially available as dyes, including Cyan, Magenta, and Yellow, at a small weight percent concentration. Another example of pigments or chromophores include lithol rubine (Red), B: copper thalocyanine (Blue), diarylide yellow (Yellow) at 4 weight percent concentration. The oil will position itself against the hydrophobic layer 518 on the bottom surface of the well 516. The water 534 may be any fluid that does not mix with oil. The oil 532 and water 534 combination may contain surfactants and other elements to extend the temperature range of the fluid, aid manufacturing, and improve oil repulsion. The water 534 is placed on the oil 532 and sealed in place by a seal (not shown). FIG. 13 is a top view of the wells 516 formed in a matrix. The wells may be formed in a circular or rectangle form. In operation (FIG. 14), a voltage is applied to the conductors 512 in a manner described with reference to the known electrowetting pixel of FIG. 4, to move the oil to the side against the hydrophilic material 526 and away from the hydrophobic material 518, thereby allowing light to enter the wells 516 through the water 534 and reflect off of the substrate 510.

Figure 15:
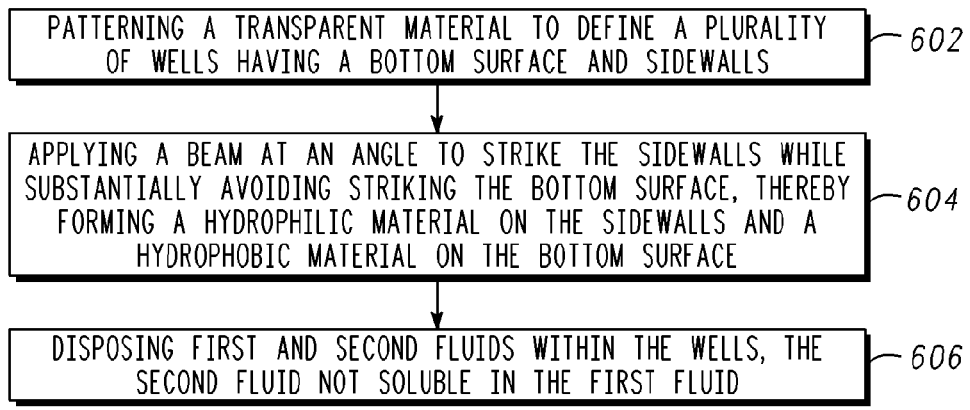
FIG. 15 is a flow chart of the steps in accordance with the exemplary embodiments.

FIG. 15 is a flow chart of the exemplary embodiments. A material is patterned 602 to define a plurality of wells having a bottom surface and sidewalls. A beam is applied 604 at an angle to strike the sidewalls while substantially avoiding striking the bottom surface, thereby forming a hydrophilic material on the sidewalls and a hydrophobic material on the bottom surface. First and second fluids are disposed 606 within the wells, the second fluid insoluble in the first fluid.

Figure 16:
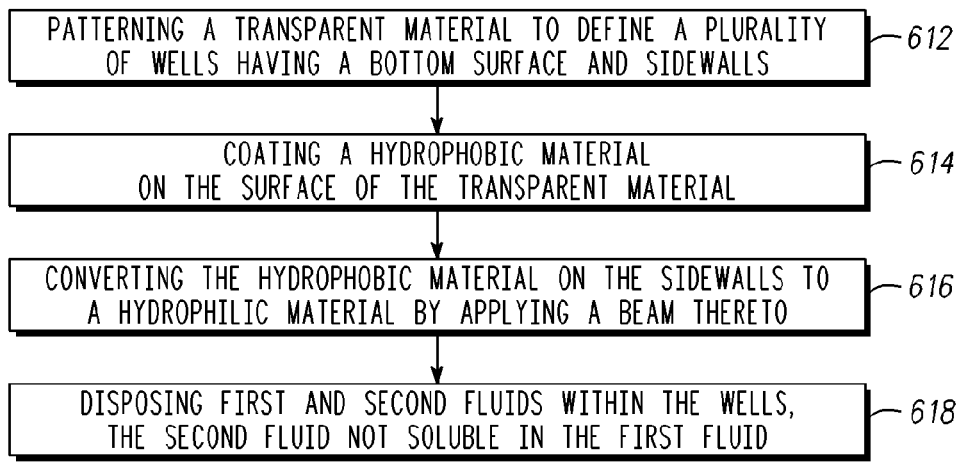
FIG. 16 is a flow chart of the steps in accordance with the first exemplary embodiment.
Figure 17:
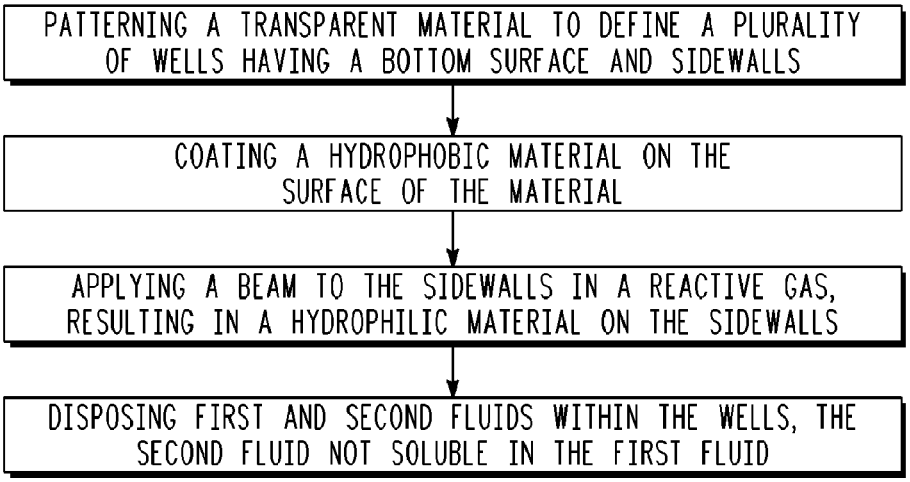
FIG. 17 is a flow chart of the steps in accordance with the second exemplary embodiment.
Figure 18:
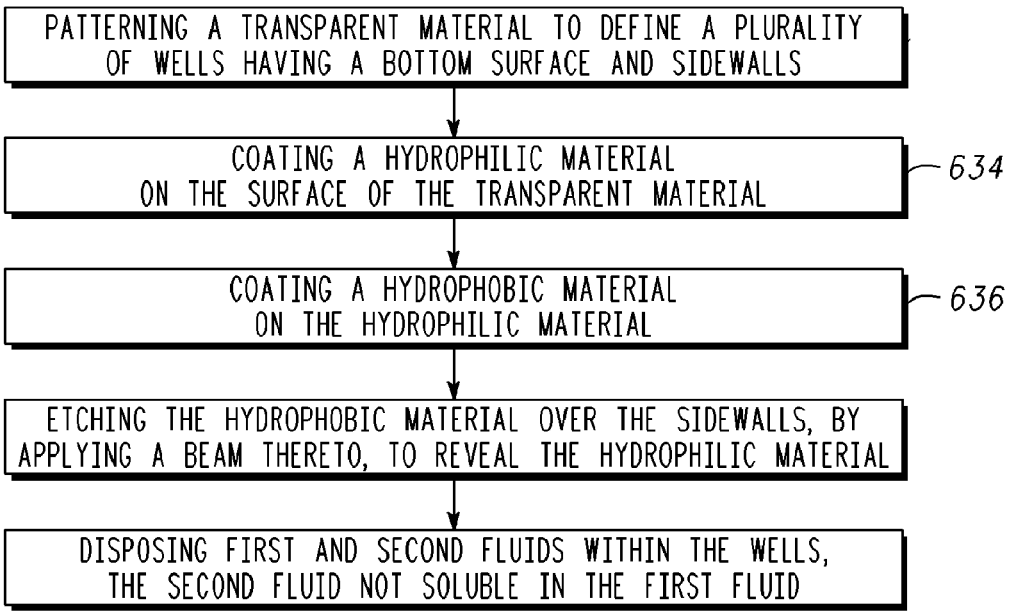
FIG. 18 is a flow chart of the steps in accordance with the third exemplary embodiment.

In the selective reaction exemplary embodiment (FIG. 16), a hydrophobic material is coated 612 on the surface of the material, and the hydrophobic material is converted 614 to a hydrophilic material by applying a beam thereto. In the selective deposition exemplary embodiment (FIG. 17), a hydrophobic material is coated 604 and a reactive gas and a beam are applied to form the hydrophilic material on the sidewalls. In the selective etching exemplary embodiment (FIG. 18), a hydrophilic material is coated 634 on the surface of the material, a hydrophobic material is coated 636 on the hydrophilic material, and the hydrophobic material over the sidewalls is etched by applying a beam thereto to reveal the hydrophilic material on the sidewalls.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method of forming a matrix of electrowetting pixels, comprising:
    patterning a base material defining a plurality of wells having a bottom surface and sidewalls;
    forming a hydrophobic material on the bottom surface;
    applying a beam upon the sidewalls at an angle to form a hydrophilic material on the sidewalls; and
    disposing first and second fluids within the wells, the second fluid insoluble in the first fluid.

2. The method of claim 1 wherein the applying step comprises coating the hydrophobic material on the sidewalls, and converting the hydrophobic material on the sidewalls to a hydrophilic material.

3. The method of claim 2 wherein the applying a beam converts the hydrophobic material to a hydrophilic material by adding hydroxyl groups, and an injection of polar molecules capable of hydrogen bonding.

4. The method of claim 1 wherein the applying step comprises:
    coating a hydrophobic material on the sidewalls; and
    applying a reactive gas that forms a hydrophilic material on the hydrophobic material.

5. The method of claim 1 wherein the beam comprises one of an ion beam, a molecular beam, a laser beam, an ultra violet beam, and an x-ray beam.

6. The method of claim 1 wherein the first liquid comprises water and the second liquid comprises oil.

7. A method of forming a matrix of electrowetting pixels, comprising:
    forming a patterned layer of electrodes on a substrate;
    forming a patterned insulating material on the electrodes and the substrate to define a plurality of wells;
    applying a beam to sidewalls of the wells to form a hydrophilic material on the sidewalls while forming a hydrophobic material on bottom surfaces of the wells; and
    placing first and second liquids within the wells, the second liquid being insoluble in the first liquid.

8. The method of claim 7 wherein the applying step comprises coating a hydrophobic material on the surface of the insulating material, wherein the applying a beam converts the hydrophobic material on the sidewalls to a hydrophilic material.

9. The method of claim 8 wherein the applying a beam converts the hydrophobic material to a hydrophilic material by adding hydroxyl groups, and an injection of polar molecules capable of hydrogen bonding.

10. The method of claim 7 wherein the applying step comprises:
    coating a hydrophobic material on the surface of the insulating material; and applying a reactive gas that forms a hydrophilic material on the hydrophobic material.

11. The method of claim 7 wherein the beam comprises one of an ion beam, a molecular beam, a laser beam, an ultra violet beam, and an x-ray beam.

12. The method of claim 7 wherein the first liquid comprises water and the second liquid comprises oil.

13. A method of forming a matrix of electrowetting pixels, comprising:

forming a patterned layer of electrodes on a substrate;

forming a patterned insulating layer on the electrodes and the substrate to define a plurality of wells, each of the wells aligned over one of the electrodes;

forming a hydrophobic material on the bottom surfaces of the wells and a hydrophilic material on sidewalls of the wells by the application of a beam at an angle to impact the sidewalls while substantially avoiding impacting the bottom surface;

placing first and second liquids within the wells, the second liquid insoluble in the first liquid.

14. The method of claim 13 wherein the applying step comprises coating a hydrophobic material on the surface of the insulating material, wherein the applying a beam converts the hydrophobic material on the sidewalls to a hydrophilic material.

15. The method of claim 14 wherein the applying a beam converts the hydrophobic material to a hydrophilic material by adding hydroxyl groups, and an injection of polar molecules capable of hydrogen bonding.

16. The method of claim 13 wherein the applying step comprises:

coating a hydrophobic material on the surface of the insulating material; and applying a reactive gas that forms a hydrophilic material on the hydrophobic material.

17. The method of claim 13 wherein the beam comprises one of an ion beam, a molecular beam, a laser beam, an ultra violet beam, and an x-ray beam.

18. The method of claim 13 wherein the first liquid comprises water and the second liquid comprises oil.

* * * * *